Aug. 6, 1940.   W. E. GILDERSLEEVE ET AL   2,210,756
CONTROL SYSTEM
Filed March 31, 1939   2 Sheets-Sheet 1

Inventors:
William E. Gildersleeve,
Edward D. Beachler,
by Harry E. Dunham
Their Attorney.

Patented Aug. 6, 1940

2,210,756

UNITED STATES PATENT OFFICE 2,210,756

CONTROL SYSTEM

William E. Gildersleeve and Edward D. Beachler, Schenectady, N. Y., assignors to General Electric Company, a corporation of New York Application March 31, 1939, Serial No. 265,210

9 Claims. (Cl. 172—179)

This invention relates to control systems, more particularly to systems for controlling the operation of electric motors, and it has for an object the provision of a simple, reliable, and improved system of this character.

More specifically, the invention relates to control systems for series wound motors, and a further object of the invention is the provision of an improved dynamic braking control for a plurality of series wound motors.

Occasionally one of the plurality of driving motors is incapacitated, or it may be desirable to operate the drive with one or more of the driving motors inactive, and still have the dynamic braking circuit effective to brake the active motors or even a single motor. Accordingly, a further object of the invention is the provision of an improved dynamic braking control system for a plurality of series wound driving motors in which one or more of the driving motors may be cut out without in any manner interfering with the effectiveness of the dynamic braking circuit.

In carrying the invention into effect in one form thereof, means are provided for connecting a plurality of series wound motors to a source of power supply for operation in either direction, and means are provided for connecting the armatures and series field windings in series relationship with each other upon interruption of the supply of power to the motors to form a dynamic braking circuit with the current flowing in the field windings in the same direction as in the previous power operation, irrespective of the direction of previous power operation.

Figure 1:
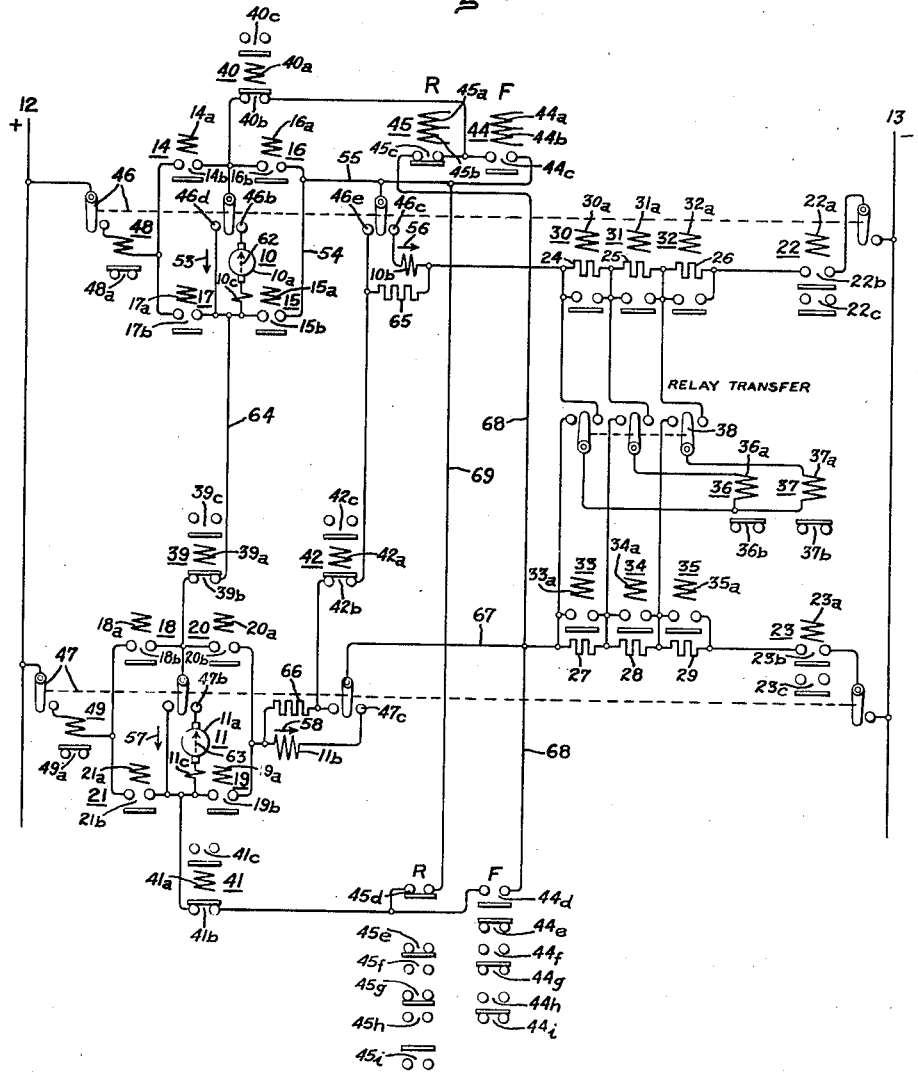
Figure 2:
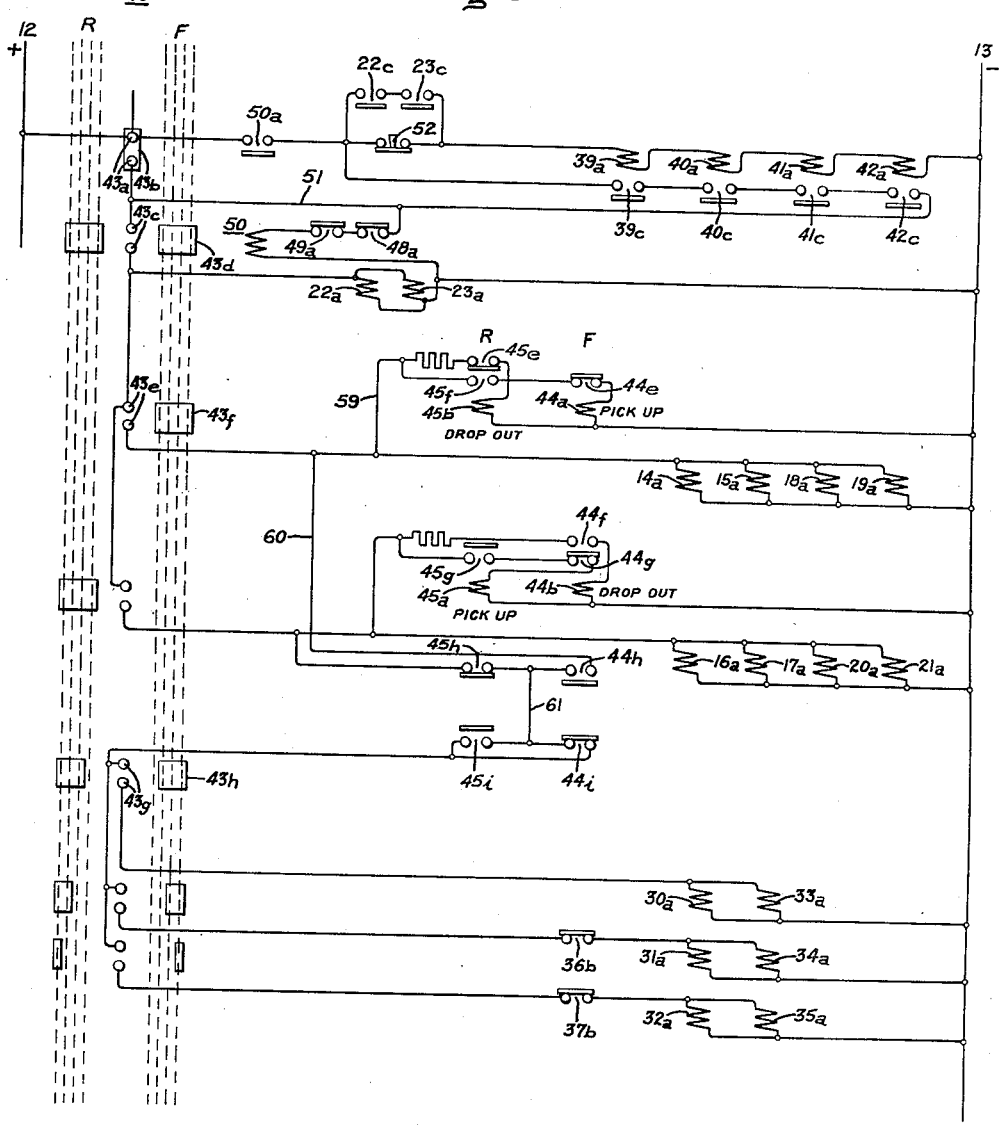

For a better and more complete understanding of the invention, reference should now be had to the following specification and to the accompanying drawings of which Fig. 1 is a simple, diagrammatical sketch of the power circuits and associated control apparatus of an embodiment of the invention, and Fig. 2 is a simple, diagrammatical sketch of the master switch and control circuits controlled by the master switch for controlling the apparatus of Fig. 1.

Referring now to the drawings, a plurality of series wound, direct current motors 10 and 11 are arranged to be connected to a direct current source of supply represented by the two supply lines 12 and 13. Motor 10 has an armature member 10a, a series field winding 10b, and a series commutating field winding 10c, and similarly, motor 11 has an armature member 11a, a series field winding 11b, and a series commutating field winding 11c. Although, in the interest of simplicity, only two motors are illustrated, the invention is applicable to a larger number of motors.

Directional contactors 14, 15 are provided for causing the current to flow through the armature 10a to effect rotation of the motor in the forward direction, and directional contactors 16, 17 are provided for causing current to flow in the armature 10a in a direction to effect reverse rotation. Contactors 14, 15, 16, and 17 are provided with operating coils 14a, 15a, 16a, and 17a respectively and with main contacts 14b, 15b, 16b, and 17b respectively. Similarly, "forward" contactors 18 and 19 and "reverse" contactors 20 and 21 are provided for controlling the direction of operation of motor 11. As shown, contactors 18, 19, 20, and 21 are provided with operating coils 18a, 19a, 20a, and 21a respectively and with main contacts 18b, 19b, 20b, and 21b respectively. The control circuits for operating coils 14a to 21a inclusive are not shown in Fig. 1, but these operating coils, together with their control circuits, are shown in Fig. 2.

Line contactors 22 and 23 are provided for connecting motors 10 and 11 respectively to the supply source. Contactor 22 is provided with an operating coil 22a and with main power contacts 22b and interlocking control contacts 22c. Similarly, contactor 23 is provided with an operating coil 23a, main power contacts 23b and interlocking control contacts 23c. The control circuits in which the operating coils 22a, 23a and the control contacts 22c and 23c are connected are shown in Fig. 2.

Suitable current limiting starting resistors 24, 25, and 26 are included in the armature circuit of motor 10, and similar starting resistors 27, 28 and 29 are included in the armature circuit of motor 11. A plurality of contactors 30, 31, and 32 are provided for short-circuiting resistor sections 24, 25 and 26 to accelerate motor 10, and similarly, a plurality of contactors 33, 34, and 35 are provided for short-circuiting resistor sections 27, 28, and 29 to accelerate motor 11. Accelerating contactors 30, 31, 32, 33, 34, and 35 have operating coils 30a, 31a, 32a, 33a, 34a, and 35a which are shown with their associated control circuits in Fig. 2. A pair of accelerating relays 36 and 37 are provided for interposing suitable time delays between the operations of the accelerating contactors to short-circuit successive sections of the resistors. Although relays 36 and 37 may be of any suitable type, they are illustrated as inductive time delay relays. These relays are provided with magnetic structures (not shown) which form a closed path when the relay is energized and its armature picked up. Thus, when the operating coils 36a and 37a of these relays are energized, their armatures pick up without time delay, and when the operating coils are short-circuited, the armatures drop out after a time delay dependent upon the time required for the flux to decay in the closed magnetic circuit. The operating coils 36 and 37 are energized by the voltage drop across sections of the accelerating resistors, and a relay transfer switch 38 is provided for connecting the operating coils 36a and 37a across resistor sections 24 and 25 respectively or across resistor sections 27 and 28 respectively as desired. Relays 36 and 37 are also provided with interlocking control contacts 36b and 37b respectively, and these interlocking control contacts are illustrated in their associated control circuits in Fig. 2.

For the purpose of establishing a suitable series dynamic braking circuit for the motors 10 and 11, a plurality of normally closed dynamic braking contactors 39, 40, 41 and 42 are provided. These dynamic braking contactors are provided with operating coils 39a, 40a, 41a, and 42a and with main contacts 39b, 40b, 41b, and 42b and interlocking control contacts 39c, 40c, 41c, and 42c respectively. The control circuits with which the operating coils and control contacts are associated are shown in Fig. 2.

A multi-position reversing type master switch 43 having a plurality of "forward" positions and a plurality of "reverse" positions is provided for starting and accelerating the motors in either direction under the control of an operator. The control of the operating coils of the dynamic braking contacts 39, 40, 41, and 42 is so arranged that when the master switch 43 is in the "off" position, the main contacts of the dynamic braking contactors are closed to establish the series dynamic braking circuits for the armatures of motors 10 and 11, and when the master switch 43 is in any of its operating positions either in the forward or reverse direction, the main contact of each dynamic braking contactor is opened so that the dynamic braking circuit is disconnected from the operating circuit.

An additional pair of dynamic braking contactors 44 and 45 is provided for setting up in advance or preparing dynamic braking circuits such that when the dynamic braking circuit is finally completed, the current will flow through the armatures and field windings of the motors in the correct direction irrespectively of the direction of the previous power operation of the motor. These two contactors are of the magnetically latched-in type and thus each requires both a pick-up coil and a drop-out coil. For example, forward contactor 44 has a pick-up coil 44a and a drop-out coil 44b, and similarly, reverse contactor 45 has a pick-up coil 45a and a drop-out coil 45b. When the master switch 43 is operated in either direction, one or the other of the pick-up coils 44a, 45a is energized and the contacts of the contactor are operated to the picked-up position in which they remain until the master switch is operated in the opposite direction to energize the drop-out coil. As shown in Fig. 1, the main contacts 45c and 45d and the interlocking control contacts 45e, 45f, 45g, 45h, and 45i of the reverse contactor 45 are in the picked-up position, which indicates that the last previous power operation of the motors 10 and 11 was in the reverse direction.

The forward directional braking contactor 44 is provided with main contacts 44c and 44d and with interlocking control contacts 44e, 44f, 44g, 44h, and 44i.

With the foregoing understanding of the apparatus and its organization in the system, the operation of the system itself will readily be understood from the following description: Assuming that both motors 10 and 11 are to be operated, line switches 46 and 47 are moved to their right-hand closed positions. Further assuming the normally closed contacts 48a and 49a of overload protection relays 48 and 49 to be in their closed positions, the operating coil of under-voltage relay 50 is connected to the supply source through a circuit traced from the positive side 12 of the supply source through fingers 43a of the master switch bridged by the segment 43b, conductor 51, contacts 48a and 49a of the overload relays, operating coil of undervoltage relay to the negative side 13 of the supply source. In response to energization, undervoltage relay closes its contacts 50a and completes an energizating circuit for the operating coils 39a, 40a 41a, and 42a of the dynamic braking contactors through the normally closed contacts of the emergency switch 52. Contactors 39, 40, 41, and 42 open their normally closed main contacts 39b, 40b, 41b, and 42b, and close the normally open control contacts 39c, 40c, 41c, and 42c in response to energization of their operating coils. The closing of interlocking contacts 39c, 40c, 41c, and 42c completes the holding circuit for the operating coil of undervoltage relay 50 independent of the segment 43b of the master switch. When the master switch is moved to its first operative position in either direction, if any one of the dynamic braking contactors 39, 40, 41, 42 has failed to open its main contacts and close its auxiliary control contacts, the under voltage relay will be deenergized and will open its contacts 50a to deenergize the operating coils of the dynamic braking contactors. As a result of such deenergization, the dynamic braking contactors will close their normally closed main contacts to establish a dynamic braking circuit for the armatures of the motors and open their interlocking control contacts thereby to prevent the control from functioning to connect the motors to the supply source.

Assuming, however, that all of the interlocking control contacts 39c, 40c, 41c, and 42c are closed, the motors may be started by operating the master switch to its first position in either direction. If the motors are to be operated in the forward direction, the master switch is moved to the first forward position in which an energizing circuit is established for the operating coils 22a and 23a of line contactors 22 and 23. This circuit is traced from the positive side of the supply source through the contacts 50a of the undervoltage relay, through the contacts 39c, 40c, 41c, and 42c, fingers 43c of the master switch bridged by the segment 43d, operating coils 22a and 23a in parallel and thence to the negative side 13 of the supply source.

Line contactors 22 and 23 close their main and control contacts in response to energization. The main contacts 22b and 23b partially complete a power circuit for the armatures of motors 10 and 11 to the negative side 13 of the supply source. Control contacts 22c and 23c complete a short circuit around the normally closed contacts of the emergency switch 52 thereby preventing operation of the emergency switch to establish a dynamic braking circuit when the armatures of the motors are connected to the supply source.

which would result in short-circuiting the supply source.

Simultaneously, the operating coils 14a, 15a, 18a, and 19a of the forward reversing contactors are energized. This circuit is traced from the lower finger 43c through fingers 43e bridged by the segments 43f of the master switch through the operating coils 14a, 14a, 18a, and 19a in parallel to the negative side 13 of the supply source. In response to energization, directional contactors 14, 15, 18, and 19 close their contacts and connect the motors 10 and 11 to the supply source 12, 13 for rotation in the forward direction. The circuit for the armature 10a of motor 10 is traced from the positive side 12 of the supply source through the contacts of line switch 46, series coil of overload relay 48, directional contacts 14b, line switch contacts 46b, armature 10a in the direction of the arrow 53, commutating field 10c, directional contacts 15b, conductors 54 and 55, contacts 46c of the line switch, series field 10b in the direction of the arrow 56, resistors 24, 25, and 26, and through the contacts 22b of the line contactor and line switch to the opposite side of the supply source.

The circuit for the motor 11 is similar and the current flows through the armature 11a in the direction of the arrow 57 and through the series field winding 11b in the direction of the arrow 58.

Simultaneously with the energization of the directional contactors, an energizing circuit is completed for the drop-out coil 45b of the reverse directional dynamic braking contactor 45. This circuit is traced from the lower finger 43e of the master switch through conductor 59, contacts 45e (in the closed position thereof), drop-out coil 45b and thence to the negative side of the supply source. In response to energization, coil 45b opens main directional contacts 45c and 45d and simultaneously opens interlocking control contacts 45e and 45h and closes control contacts 45f, 45g, and 45i.

Contacts 45e in opening interrupt the energizing circuit for the drop-out coil 45b and complete an energizing circuit through contacts 44e for the pick-up coil 44a.

In response to the energization of its pick-up coil, forward directional dynamic braking contactor 44 closes its main contacts 44c and 44d and also closes its control contacts 44f and 44h and opens its control contacts 44e, 44g, and 44i.

To accelerate the motor to full speed, the master switch 43 is moved successively to its second, third, and fourth right-hand positions.

In the second position of the master switch, an energizing circuit is established for the operating coils 30a and 33a of accelerating contactors 30 and 33 respectively. This circuit is traced from the lower finger 43e of the master switch through conductor 60, contacts 44h in the closed position thereof, conductor 61, contacts 45i in the closed position thereof, fingers 43g of the master switch bridged by the segment 43h, operating coils 30a and 33a, to the opposite side of the supply source. Contactors 30 and 33 close in response to energization and short-circuit resistor sections 24 and 27 thereby to increase the speeds of the motors 10, 11.

When the armature circuit of motor 10 was first completed, the voltage drop across resistors 24 and 25 was sufficient to energize the operating coils of accelerating relays 36, 37 (assuming the relay transfer switch thrown to the right). As a result of this energization, relays 36 and 37 opened their contacts 36b and 37b in the circuits of the operating coils of accelerating contactors 31, 32, 34 and 35.

Short-circuiting the resistor 24 also short-circuits the operating coil 36a of the accelerating relay 36 which is connected across the resistor 24. As a result, the flux starts to decay in the closed magnetic circuit of this relay.

Operation of the master switch 43 to the third position completes an energizing circuit for the operating coils 31a and 34a of accelerating contactors 31 and 34 after the interval of time required for the flux to decay in the magnetic structure of accelerating relay 36 to allow the contacts 36b to drop out and close the energizing circuit for operating coils 31a and 34a. Contactors 31 and 34 close in response to energization and short-circuit resistors 25 and 28 thereby further increasing the speeds of the motors 10 and 11.

The operation on the fourth point of the master switch is similar to the operation on the third point with the result that the resistors 26 and 29 are short-circuited after an interval of time imposed by the accelerating relay 37, and the motors 10 and 11 are accelerated to full speed.

To stop the motors 10 and 11, the master switch 43 is moved to its central or off position in which the line contactors 22, 23, directional contactors 14, 15, 18, and 19, and accelerating contactors 30, 31, 32, 33, 34, and 35 are opened. The motors 10 and 11 coast to rest in the normal manner. However, if some emergency condition should make it imperative to bring the motors rapidly to standstill, the operator will depress the emergency switch 52 to open its contacts. Since contacts 22c and 23c are open when the master switch is in the off position, depressing the emergency switch 52 interrupts the energizing circuit of coils 39a, 40a, 41a, and 42a. As a result of deenergization, dynamic braking contactors 39, 40, 41, and 42 drop out and close their main contacts 39b, 40b, 41b, and 42b. Since the main contacts of the directional dynamic braking contactors remain in their picked up positions until the master switch is moved to an operative position in the opposite direction to energize the drop-out coils, the main contacts 44c and 44d of contactor 44 remain closed.

Just prior to the disconnection of the motors 10, 11 from the supply source, current was flowing through the armatures 10a and 11a in the directions represented by the arrows 53 and 57 respectively. The directions of the countervoltages of these motors were in the reverse direction as represented by the dotted arrows 62 and 63. Accordingly, the closing of the main contacts of dynamic braking contactors 39, 40, 41, and 42 completed a dynamic braking circuit for the motors 10 and 11. The direction of current flow in this dynamic braking circuit is as follows: From the upper or positive terminal of the armature 11a, through contacts 47b of the line switch in the closed position, normally closed contacts of dynamic braking contactor 39, conductor 64, commutating field and armature 10a (in the direction of the arrow 62), contacts 46b, normally closed contacts 40b of dynamic braking contactor 40, contacts 44c of directional dynamic braking contactor, contacts 46c of the line switch, series field 10b in the direction of the arrow 56, resistor 65, contacts 42b of dynamic braking contactor 42, resistor 66, series field 11b (in the direction of the arrow 58), contacts 47c, conductors 67 and 68, contacts 44d of the directional dynamic braking contactor, contacts 41b of dynamic braking contactor 41, and thence through the commutating field 11c to the negative armature terminal of motor 11. Thus it will be noted that although the direction of current flow through the armatures 10a and 11a is reversed, the direction of current flow through the series field windings 10b and 11b is the same as during the previous power operation, and consequently, the flux of these series fields does not have to pass through zero. The result is that the motors are braked rapidly to rest.

If either of the motors 10 or 11 were disabled, or for some other reason taken out of service, the dynamic braking circuit would still be effective to brake the other motor. For example, assume the motor 10 to be disabled, or that for some other reason it is desired not to operate this motor. The line switch 46 is moved to the left to interrupt the power connections to the source and to close the contacts 46d and 46e. Opening the contacts 46b and 46c disconnects the armature 10a and the series field winding 10b from the dynamic braking circuit, and closing the contacts 46d and 46e completes the dynamic braking circuit with the armature 10a and field winding 10b disconnected therefrom.

In a similar manner, the motor 11 may be taken out of service and the dynamic braking circuit will still be effective to brake the motor 10. Thus either of the motors may be taken out of service and the dynamic braking circuit will still be effective to brake the other motor.

When it is desired to bring the motors to standstill very rapidly, the master switch is thrown from an operative position on one side to an operative position on the other side thereby to disconnect the motors from the source and to reconnect them for rotation in the reverse direction. This produces a very large braking torque and the motors are braked rapidly to standstill. This operation is known as "plugging."

If the power supply should fail when the motors are connected to the power source either for normal power operation or plugging operation, undervoltage relay 50 would open its contacts 50a and deenergize the operating coils 39a, 40a, 41a, and 42a of the dynamic braking contactors. This would have the same effect as depressing the emergency switch 52 when the master switch is in the off position, and as a result, the dynamic braking circuit described in the foregoing would be set up and the motors braked rapidly to rest.

The reverse power operation of the motors 10 and 11 is substantially identical with the forward power operation, with the exception that the reverse contactors 16, 17, and 20, 21 and the reverse directional dynamic braking contactor 45 are closed instead of the corresponding forward contactors. Current then flows through the armature of the motor 10 in the direction of the dotted arrow 62 and through the series field winding 10d in the direction of the arrow 56. Similarly, the current flows through the armature of the motor 11 in the direction of the dotted arrow 63 and through the series field winding 11d in the direction of the arrow 58.

When the master switch 43 is returned to the off position and emergency button 52 is depressed to complete the dynamic braking circuit, current flows through the armatures 10a and 11a of motors 10 and 11 in the reverse direction and through the series field windings 10b and 11b in the same direction as during the previous power operation. The current flow is traced as follows: From the lower positive terminal of the armature 10a through conductor 64, main contacts of dynamic braking contactor 39, armature 11a in the direction of the arrow 57, main contacts of dynamic braking contactor 41, contacts 45d of reverse directional dynamic braking contactor 45, conductor 69, series field winding 10b in the direction of the arrow 56, resistor 65, contacts 42b of dynamic braking contactor 42, resistor 66, series field winding 11b in the direction of the arrow 58, conductors 67 and 68, contacts 45c of the directional dynamic braking contactor, main contacts of dynamic braking contactor 40 to the upper negative terminal of armature 10a.

Thus it will be noted that the current in the dynamic braking circuit flows through the series field windings 10b and 11b in the same direction as during the previous power operation, and it will also be noted that this is true irrespective of the direction of the previous power operation.

Although in accordance with the provisions of the patent statutes, this invention is described as embodied in concrete form, and the principle of operation has been explained together with the best mode in which it is now contemplated applying that principle, it will be understood that the apparatus and connections shown are merely illustrative and that the invention is not limited thereto, since alterations and modifications will readily suggest themselves to persons skilled in the art without departing from the true spirit of the invention or from the scope of the annexed claims.

What we claim as new and desire to secure by Letters Patent of the United States is:

1. In combination, a plurality of series wound motors, a reversing master switch, means responsive to an operation of said master switch for connecting the armature and field winding of one of said motors to a source of supply in parallel with the armature and field winding of another of said motors, means responsive to said operation of said master switch for partially completing a series dynamic braking circuit for said armatures and field windings such that when completed the direction of current flow in said field windings will be the same as during the power operation, and means responsive to interruption of the supply of power to said motors for completing said dynamic braking circuit.

2. A motor control system comprising in combination, a plurality of series wound electric motors, a reversing type master switch, means responsive to operation of said switch for connecting said motors in parallel to a source of power, an electromagnetically actuated contactor responsive to said operation of said master switch for partially establishing a series dynamic braking circuit for the armatures and field windings of said motors such that when completed the current will flow through said field windings in the same direction as during the previous power operation and a second electromagnetically actuated contactor for completing said dynamic braking circuit upon interruption of the supply of power to said motors.

3. In a control system for a plurality of series wound electric motors, the combination with a reversing type master switch of a plurality of electromagnetically actuated contactors responsive to operation of said master switch for establishing connections of said motors to a source of power for operation in either direction, a pair of directional dynamic braking contactors responsive to operation of said master switch for partially establishing a series dynamic braking circuit including the armature and field windings of all of said motors in which, when said circuit is completed, the current will flow in the same direction in said field windings as during the previous power operation irrespectively of the direction of said power operation, and additional electromagnetically actuated contactor means for completing said circuit in response to interruption of the supply of power to said motors.

4. A control system for a plurality of motors each having an armature and a series field winding, each of said field windings having an armature terminal and a line terminal, normally closed contacts between an armature terminal of one of said motors and an armature terminal of opposite polarity of another of said motors, two pairs of directional contacts between the other terminals of said armatures and the armature terminal of one of said field windings and the line terminal of a second of said field windings, normally closed contacts between a line terminal of said first field winding and the armature terminal of said second field winding, means for connecting said motors to a source of power for operation in either direction and for opening said normally closed contacts and closing one of said pairs of directional contacts thereby partially to establish a series dynamic braking circuit for said armatures and field windings in which, when completed, current will flow in said field windings in the same direction as in the previous power operation, and means for closing said normally closed contacts to complete said circuit upon interruption of the supply of power to said motors.

5. In combination, a pair of motors each having an armature and a series field winding, each of said field windings having an armature terminal and a line terminal, normally closed contacts connected between the armature terminal of one of said windings and the line terminal of the other of said windings, two pairs of directional contacts between the other armature and line terminals of said field windings and a terminal of one of said armatures and a terminal of opposite polarity of the other of said armatures, normally closed contacts between the other terminals of said armatures, a reversing type master switch for controlling the connection of said motors to a source of supply for operation in either direction and for controlling the opening of said normally closed contacts and for selectively controlling the closing of said directional contactors thereby partially to establish a series dynamic braking circuit for said armatures and field windings such that, when completed, the current will flow in said field windings in the same direction as in the previous power operation, and means for closing said normally open contacts to complete the establishment of said dynamic braking circuit upon interruption of the supply of power to said motors.

6. A control system for a plurality of motors each having an armature and a series field winding, each of said field windings having an armature terminal and a line terminal, normally closed contacts connected between a terminal of one of said armatures and a terminal of opposite polarity of another of said armatures, normally closed contacts connected between a line terminal of the field winding for one of said armatures and the armature terminal of the field winding for said other of said armatures, two pairs of directional contacts connected between the other terminals of said armatures and the other terminals of said field windings, normally closed contacts between said other terminals of said armatures and said directional contactors, a reversing type master switch for controlling the connection of said motors to a source of supply for operation in either direction and for controlling the opening of said normally closed contacts and the closing of said directional contactors thereby partially to establish a series dynamic braking circuit including said armatures and field windings, such that the direction of current flow in said field windings is the same as in the previous power operation, and means for closing said normally closed contacts to complete the establishment of said circuit upon interruption of the power supply to said motors.

7. In combination, a plurality of electric motors each having an armature and a series field winding, a master switch and means controlled thereby for connecting said motors in parallel to a source, an energizing control device for effecting the connection of said armatures and field windings in a series dynamic braking circuit with the direction of current flow in said field windings the same as during the previous power operation, and means for rendering said energizing control device ineffective except in the off position of said master switch.

8. In combination, a plurality of electric motors each having an armature and a series field winding, a reversing type master switch and means controlled thereby for connecting said motors in parallel to a source of power, an emergency control device for effecting the connection of said armatures and field windings in a series dynamic braking circuit with the current flowing in said field windings in the same direction as in the previous power operation irrespective of the direction of said operation, and contacts actuated by said master switch for short-circuiting said emergency control device thereby to render said device inactive except when said master switch is in the off position.

9. A control system for a pair of motors each having an armature and a series field winding comprising in combination, means for connecting said motors in parallel to a supply source for operation in either direction, means for connecting said armatures and field windings in series with each other in a dynamic braking circuit with the current flowing in said field windings in the same direction as in the previous power operation irrespectively of the direction of said power operation, and means for disconnecting one of said motors from said dynamic braking circuit and retaining said dynamic braking circuit for the remaining motor.

WILLIAM E. GILDERSLEEVE.
EDWARD D. BEACHLER.